No. 846,880. PATENTED MAR. 12, 1907.
G. WALKER.
SPRING SCALE.
APPLICATION FILED JAN. 14, 1907.

Witnesses.
S. H. Clarke
P. J. Egan

Inventor
George Walker
By James Shepard
Atty.

UNITED STATES PATENT OFFICE.

GEORGE WALKER, OF NEW BRITAIN, CONNECTICUT, ASSIGNOR TO LANDERS, FRARY AND CLARK, OF NEW BRITAIN, CONNECTICUT, A CORPORATION.

SPRING-SCALE.

No. 846,880.      Specification of Letters Patent.      Patented March 12, 1907.

Application filed January 14, 1907. Serial No. 352,157.

*To all whom it may concern:*

Be it known that I, GEORGE WALKER, a citizen of the United States, residing at New Britain, in the county of Hartford and State of Connecticut, have invented certain new and useful Improvements in Spring-Scales, of which the following is a specification.

My invention relates to improvements in spring-scales; and the object of my improvement is convenience and efficiency in use, particularly with reference to the devices employed for adjusting the effective length of the counterbalancing-springs.

Figure 1:
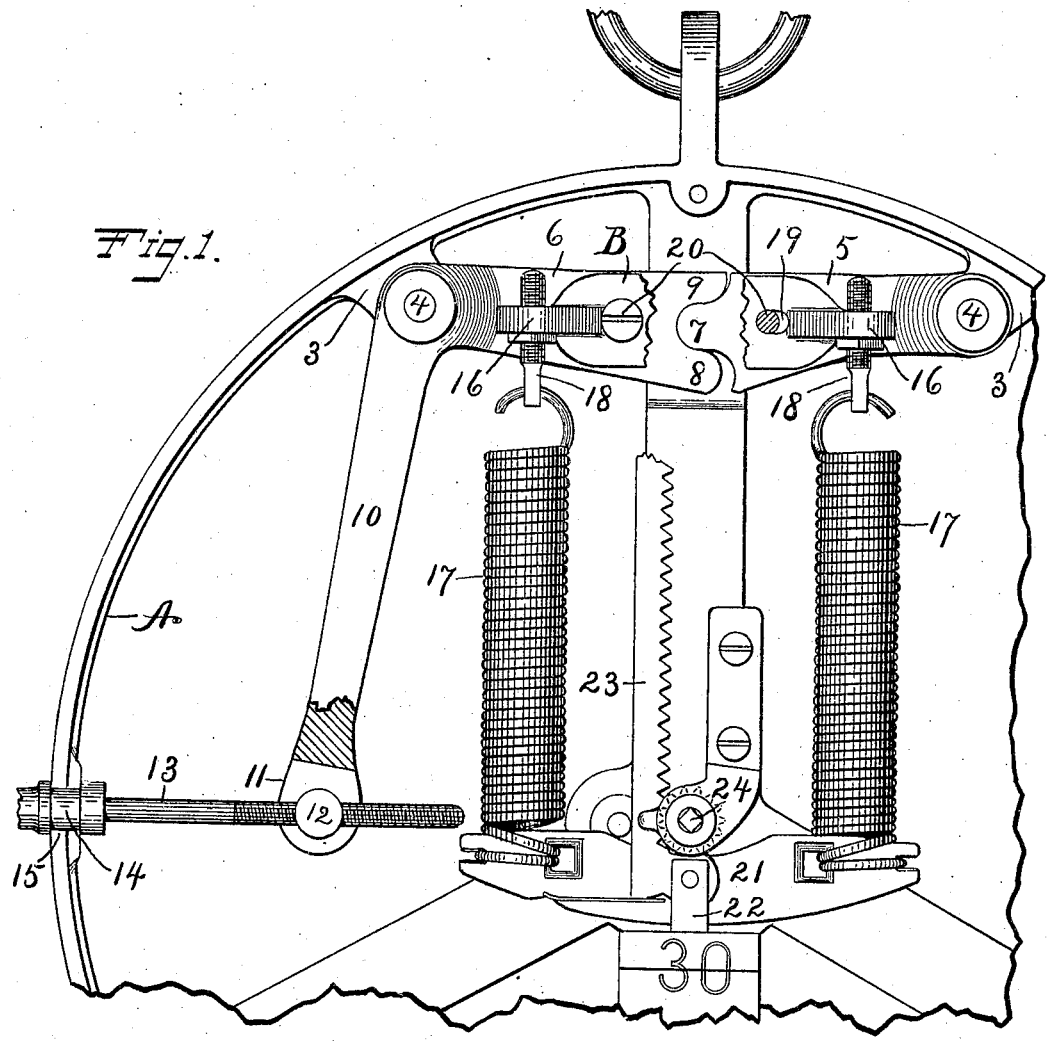
Figure 2:
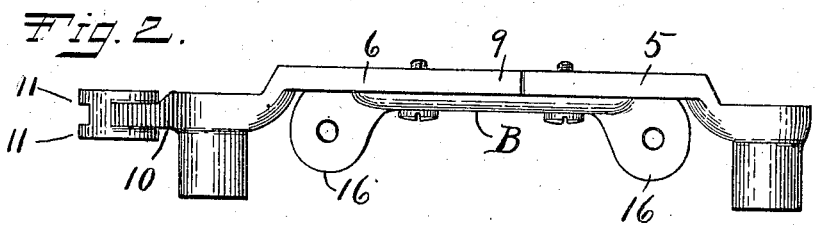

In the accompanying drawing, Figure 1 is a broken front elevation of the case, the draw-bar, the counterbalancing-springs, and the connections of the said springs with the case. Fig. 2 is a plan view of the hanger-frame for the counterbalancing-springs and the levers by which said hanger-frame is connected with the case.

A designates the frame or case, which in general is and may be of any ordinary construction. I form two lugs 3 at the inner side of the frame near the top, upon which lugs I pivot, by means of the studs, posts, or pins 4, the two hanger-levers 5 and 6. The lever 5 is a simple swinging arm with a gear-like tooth 7 at the end farthest from its pivotal pin 4, the said arm extending, substantially, in a horizontal direction from the said pin. The other hanger-lever 6 is a similar arm extending in like manner and having at the end that is farthest from its pivotal pin 4 two partial teeth 8 9, with recess between, all of gear-like form and engaging the confronting end of the lever 5, as best shown in Fig. 1, whereby the said two levers are connected or geared together so that they move in unison. The said lever 6 is also provided with an arm 10, that extends downwardly from its pivotal pin at one side of the case. This arm 10 has at its lower end two perforated lugs 11, within which lugs a rocking nut 12 is mounted, while an adjusting-screw 13 passes through the said nut between the lugs 11, with its head end (illustrated as broken off) extending outside of the case.

Provision is made to hold the screw 13 against longitudinal movement while it is free to rotate. As shown, this is done by forming a shouldered neck 14 on the screw and letting the said neck into a slot 15 in the frame of the case, all as in ordinary rotating screws which are confined against longitudinal movement.

The hanger-bar B is illustrated with its middle portion broken out in Fig. 1 in order to show the gear-like teeth that connect the confronting ends of the hanger-levers 5 and 6. This hanger-bar is provided with perforated lugs 16 at its front near each end, upon which lugs the ordinary counterbalancing-springs 17 are hung in any ordinary manner—as, for example, by means of ordinary hanger-screws 18. The bar B is also provided with screw-holes somewhat elongated in the longitudinal direction of the bar, as one of the said screw-holes 19 is shown in Fig. 1. This bar is secured in place on the two hanger-levers by means of the screws 20, passing through the elongated holes in the said bar into threaded holes in the said levers 5 6. The right-hand one of the screws 20 is shown in transverse section in order to not have its head hide the hole in the hanger-bar, through which the said screw passes.

The lower ends of the springs 17 are connected in any ordinary manner to the cross-head 21 of an ordinary draw-bar 22, carrying the rack 23 for engaging the pinion of the pinion-shaft 24, all in any ordinary or well-known manner.

The present improvement relates wholly to the devices for adjusting the upper ends of the counterbalancing-springs. Adjusting devices for such purpose are not new. Neither is it new with this application to adjust the upper ends of the springs by means of a screw and lever. By my improvement the movement of the lever 10 6 for adjusting the springs carries the lever 5 with the lever 6, so that both ends of the hanger-bar are positively moved to insure a like movement of both springs at every adjustment of the hanger-frame B. The construction also enables me to readjust either spring separately without changing the adjustment of the other spring.

I claim as my invention—

In a spring-scale, the combination of a case or frame with two hanger-levers geared together for moving in unison, with a hanger-bar connected by one end to one of the said hanger-levers and by its other end to the other hanger-lever, and the counterbalancing-springs of the scale suspended on the opposite ends of the said hanger-bar.

GEORGE WALKER.

Witnesses:
 JOHN CONLON,
 FRANK T. PUNDERSON.